Patented Mar. 7, 1939

2,150,000

UNITED STATES PATENT OFFICE 2,150,000

WELDING ELECTRODE

Walter B. Lair, Scotia, N. Y., assignor to General Electric Company, a corporation of New York No Drawing. Application December 28, 1936, Serial No. 117,888

6 Claims. (Cl. 219—8)

My invention relates to an improved arc welding flux and particularly to metallic arc welding electrodes coated with said flux.

In metallic arc welding an arc is maintained between the work to be welded and a rod, wire or strip of metal usually referred to as an electrode. During welding the electrode is fused or vaporized, or both, and the metal thereof incorporated in the weld produced in the work as the electrode is fed toward the work to maintain the arc.

The arcing characteristics of the electrode and the quality of the weld metal deposited depends to a large extent upon the influence of certain elements or compounds associated therewith, usually in the form of a coating. Electrodes so coated are commonly referred to as flux coated electrodes.

It is an object of my invention to provide an improved arc welding flux.

It is a further object of my invention to provide an electrode having a thin firmly adherent flux coating thereon.

Further objects of my invention will become apparent from a consideration of the following description thereof.

My improved arc welding flux has substantially the following composition:

| | Parts by weight |
|---|---|
| Titanium dioxide | 4 |
| Iron oxide | 1 to 5 |
| Sodium carbonate | 2 |
| Silica | 1 |

Hydrated lime, up to 5 per cent of the above ingredients.

Preferably my improved arc welding flux has substantially the following composition:

| | Parts by weight |
|---|---|
| Titanium dioxide | 4 |
| Iron oxide | 4 |
| Sodium carbonate | 2 |
| Silica | 1 |

Hydrated lime, up to 5 per cent of the above ingredients.

This flux may be applied as a thin coating to the surface of an electrode in the following manner: The metal rod from which the electrode is made is first pickled to remove mill scale, washed, and then placed for about one hour's treatment on the sulling racks. This final treatment produces on the surface of the rod a thin rust coating which is commonly termed a "medium sull". The sull coated rod is then placed in a water bath containing the above specified flux composition. About 44 pounds of this flux is used to each 12 gallons of water. This bath is preferably heated and agitated by the injection of steam while the rod is immersed therein. After immersion the rod is dried for about two hours, and after the flux composition has thoroughly dried on the surface of the rod it is reduced to the desired size by drawing it through one or more wire drawing dies.

In order to facilitate the drawing operation various lubricants may be added to the above referred to flux bath. With regard to the weight of flux composition in the bath I may use ½ of 1 per cent of soap or 5 per cent hydrated lime or a suitable percentage of both of these materials, preferably about ½ per cent soap and 3 per cent lime. During the drawing operation a suitable drawing compound may also be employed. I prefer to use soap to which lime has not been added.

As a result of the above described procedure an electrode is produced having a sull coated surface which is impregnated with a thin compacted coating of the above described flux compound. The coating is very thin and firmly adheres to the surface of the electrode. In appearance the electrode resembles wire prepared by one of the well-known processes wherein a sull coating is used as a die lubricant.

The various ingredients of the above described flux composition cooperate with one another in producing an electrode having superior arcing characteristics. The titanium dioxide, sull coating, and iron oxide in the proportions stated give arc stability. The sodium carbonate reacts with the titanium dioxide in the arc to produce a sodium titanate which gives improved arcing conditions. The sodium carbonate also functions to keep the coating of flux applied to the electrode rod prior to the drawing operation in a soft condition and prevents this coating from flaking from the rod during the drawing operation. This is probably due in part to the free sodium hydroxide present in the sodium carbonate. The silica present in the flux eliminates boiling of the deposited metal, and also eliminates crackling of the arc and thus causes the metal of the electrode to pass across the arc at a uniform rate.

I prefer to use in my flux composition a brown ferric oxide of a grade known to the trade as non-settling. I also prefer to employ an amorphous silica of the grade known to the trade as snow floss. The titanium dioxide employed is preferably of the commercial variety which is produced chemically. All of the materials employed are in a finely powdered condition so that they are readily suspended in the water of the flux bath employed for coating the wire or rod previous to the drawing operation.

The above described flux is particularly suited for mild steel electrodes having a carbon content of from .06 to .18 per cent, a manganese content varying with the carbon content from .15 to .60 per cent, a copper content of from .07 to .10 per cent, and a content of silicon, phosphorus and sulphur having a combined percentage of less than .05 per cent.

The above described electrode is primarily suited for high speed welding operations on mild steel base metal and may be used with alternating or direct current sources of supply.

It is of course apparent that my improved flux may be applied to an electrode in manners other than that described above without departing from my invention.

What I claim as new and desire to secure by Letters Patent of the United States is:

1. A flux for use in arc welding having substantially the following composition:

|  | Parts by weight |
|---|---|
| Titanium dioxide | 4 |
| Iron oxide | 1 to 5 |
| Sodium carbonate | 2 |
| Silica | 1 |

Hydrated lime, up to 5 per cent of the above ingredients.

2. A flux for use in arc welding having substantially the following composition:

|  | Parts by weight |
|---|---|
| Titanium dioxide | 4 |
| Iron oxide | 4 |
| Sodium carbonate | 2 |
| Silica | 1 |

Hydrated lime, up to 5 per cent of the above ingredients.

3. An electrode having associated therewith a flux of substantially the following composition:

|  | Parts by weight |
|---|---|
| Titanium dioxide | 4 |
| Iron oxide | 1 to 5 |
| Sodium carbonate | 2 |
| Silica | 1 |

Hydrated lime, up to 5 per cent of the above ingredients.

4. An electrode having associated therewith a flux of substantially the following composition:

|  | Parts by weight |
|---|---|
| Titanium dioxide | 4 |
| Iron oxide | 4 |
| Sodium carbonate | 2 |
| Silica | 1 |

Hydrated lime, up to 5 per cent of the above ingredients.

5. An electrode having a sull coated surface impregnated with a thin compacted coating of flux having substantially the following composition:

|  | Parts by weight |
|---|---|
| Titanium dioxide | 4 |
| Iron oxide | 1 to 5 |
| Sodium carbonate | 2 |
| Silica | 1 |

Hydrated lime, up to 5 per cent of the above ingredients.

6. An electrode having a sull coated surface impregnated with a thin compacted coating of flux having substantially the following composition:

|  | Parts by weight |
|---|---|
| Titanium dioxide | 4 |
| Iron oxide | 4 |
| Sodium carbonate | 2 |
| Silica | 1 |

Hydrated lime, up to 5 per cent of the above ingredients.

WALTER B. LAIR.